United States Patent
Kim

(10) Patent No.: US 7,155,184 B2
(45) Date of Patent: Dec. 26, 2006

(54) TRIPLE BAND RECEIVING APPARATUS FOR A MOBILE COMMUNICATION TERMINAL

(75) Inventor: Dae-Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 396 days.

(21) Appl. No.: 10/183,380

(22) Filed: Jun. 28, 2002

(65) Prior Publication Data

US 2003/0003952 A1  Jan. 2, 2003

(30) Foreign Application Priority Data

Jun. 29, 2001  (KR) .............................. 2001-38062

(51) Int. Cl.
*H04B 1/16* (2006.01)
(52) U.S. Cl. ..................... 455/205; 455/132; 455/209
(58) Field of Classification Search ............. 455/552, 455/160.1, 179.1, 180.1, 187.1, 189.1, 190.1, 455/191.1, 193.1, 139, 339, 151.2, 151.4, 455/168.1, 194.2, 205, 230, 276.1, 315, 318, 455/334, 341
See application file for complete search history.

(56) References Cited

U.S. PATENT DOCUMENTS

| | | | | |
|---|---|---|---|---|
| 5,852,421 | A * | 12/1998 | Maldonado ................. | 343/702 |
| 6,112,102 | A * | 8/2000 | Zhinong ................... | 455/552.1 |
| 6,125,271 | A * | 9/2000 | Rowland, Jr. .............. | 455/313 |
| 6,151,354 | A * | 11/2000 | Abbey ...................... | 375/211 |
| 6,154,177 | A * | 11/2000 | Saito et al. ................ | 343/702 |
| 6,246,866 | B1 * | 6/2001 | Phang et al. ............... | 455/188.2 |
| 6,400,963 | B1 * | 6/2002 | Glockler et al. ........... | 455/553.1 |
| 6,442,400 | B1 * | 8/2002 | Ying et al. ................. | 455/552.1 |
| 6,466,768 | B1 * | 10/2002 | Agahi-Kesheh et al. ...... | 455/78 |
| 6,667,723 | B1 * | 12/2003 | Forrester .................. | 343/858 |
| 6,694,129 | B1 * | 2/2004 | Peterzell et al. ........... | 455/76 |
| 6,711,418 | B1 * | 3/2004 | Wang et al. ............... | 455/553.1 |
| 6,728,528 | B1 * | 4/2004 | Loke ........................ | 455/318 |
| 6,766,178 | B1 * | 7/2004 | Damgaard et al. ......... | 455/552.1 |
| 6,795,714 | B1 * | 9/2004 | Fickenscher et al. ...... | 455/552.1 |
| 2002/0173337 | A1 * | 11/2002 | Hajimiri et al. ............ | 455/552 |

FOREIGN PATENT DOCUMENTS

| | | |
|---|---|---|
| CN | 1261996 A | 8/2000 |
| EP | 0923198 A2 | 6/1999 |
| EP | 1022861 | 7/2000 |
| JP | 08-212201 | 2/1998 |
| JP | 2002506314 T | 2/2002 |
| WO | WO99/01933 | 1/1999 |
| WO | WO 99/45654 | 9/1999 |

OTHER PUBLICATIONS

Japanese Office Action Dated Dec. 13, 2005.

* cited by examiner

*Primary Examiner*—Lester G. Kincaid
*Assistant Examiner*—Fred A. Casca
(74) *Attorney, Agent, or Firm*—Fleshner & Kim, LLP

(57) ABSTRACT

A triple band receiving terminal of a mobile communication system operates in three bands by installing an impedance matching unit and a band selection switching unit at the exterior of a dual band RF receiver. The triple band receiving terminal includes three filters for passing signals corresponding to three different bands, an impedance matching unit for matching impedance of signals passing the second and the third filters, and a RF (radio frequency) receiver for processing a signal inputted from the first filter and the switching unit as an intermediate frequency. Accordingly, by simplifying and minimizing the size of the construction of an internal circuit, a mobile communication terminal can be efficiently small size and light-weighed

24 Claims, 3 Drawing Sheets

TRIPLE BAND RECEIVING APPARATUS FOR A MOBILE COMMUNICATION TERMINAL

BACKGROUND OF THE INVENTION

1. Field of the Invention

The present invention relates to a receiving terminal of a mobile communication system, and more particularly, to a triple band receiving terminal of a mobile communication system. The terminal can be used in three bands by adding a circuit to a dual band mobile communication terminal.

2. Background of the Invention

Recently, a popular mobile communication terminal needs to have, multi-function, diversification and compatibility improvement, the terminal also has to be compatible with equipments related to the Internet. The mobile communication terminal market has been rapidly expanded. In addition, interests in a dual band mobile communication terminal usable as a two-way system of a GSM (global system for mobile communication) and a DCS (digital cellular system) in Europe have increased. A triple band mobile communication terminal usable in a PCS (personal communication system) besides the GSM and the DCS and usable all over the world is even more in demand.

The GSM is a TDMA (time division multiple access) digital system commonly used in European countries. The GSM supports non-synchronous and synchronous data communication, it can be linked with an ISDN, a packet switching network, the Internet, as well as a voice communication. The GSM is operated in a 900 MHz frequency band.

The DCS (digital cellular system) having a frequency range of 1800 MHz for a European PCN (personal mobile communication network) is a system upbanding the GSM. A CDMA (code division multi access) type PCS (personal communication system) uses a signal having 1900 MHz band and provides various kinds of radio communication services such as voice, data and fax, etc.

FIG. 1 is a circuit diagram illustrating a dual band receiving apparatus of a mobile communication terminal of a related art. As depicted in FIG. 1, the dual band receiving apparatus allows the mobile communication terminal operate in two bands, a 900 MHz EGSM (extended global system for mobile communication) and a 1800 MHz DCS (digital cellular system).

The dual band receiving apparatus includes a filter unit 10 receiving a signal inputted through an antenna and passing a pertinent frequency, an amplifier unit 20 amplifying the signal passing through the filter unit 10, a phase shift unit 40 receiving an oscillation frequency outputted from a local oscillator 30 and phase-modulating the frequency, and a mixing unit 50 mixing the oscillation frequency outputted through the phase shift unit 40 with the signal received through the amplifier unit 20 and outputting an intermediate frequency signal. That is, the dual band receiving apparatus of the mobile communication terminal includes a filter, a low noise amplifier, a mixer and a phase shift in order to receive signals in different bands. In addition, the amplifier unit 20, the mixing unit 50, the phase shift unit 40 and the local oscillator 30 construct a RF (radio frequency) receiver (R1) for dual band.

However, according to regional characteristics or user's preferences, a mobile communication terminal has to be used as a PCS (personal communication system) or a DCS (digital cellular system) or a GSM (global system for mobile communication). Because the mobile communication has to satisfy all three bands, a triple band receiving terminal is required.

FIG. 2 illustrates a triple band receiving apparatus of a mobile communication terminal of a related art. As depicted in FIG. 2, the triple band receiving apparatus allows the mobile communication terminal operate in multiple bands, a 900 MHz EGSM (extended global system for mobile communication), a 1800 MHz DCS (digital cellular system) and a 1900 MHz PCS (personal communication system).

The triple band receiving apparatus of the mobile communication terminal includes a first filter 11, a second filter 12 and a third filter 13 passing only a reception frequency corresponding to each frequency band among signals received through an antenna. A third LNA (low noise amplifier) 23 amplifies a signal outputted from the third filter 13, a fourth filter 14 eliminates the image signal outputted from the third LNA 23 and a RF (radio frequency) receiver (R2) mixes the signals passing the first 11, the second 12 and the fourth filters 14 with the oscillation frequency and outputs an intermediate frequency.

The RF receiver (R2) includes a first 21 and a second LNA (low noise amplifier) 22 amplifying signals passing the first 11 and the second filters 12, a first 41, a second 42 and a third 43 phase shifters receiving the oscillation frequency outputted from the local oscillator 31. Then, the RF receiver (R2) modulates the signals in quadrature, a first 51, a second 52, a third 53, a fourth 54, a fifth 55 and a sixth 56 mixers mix the oscillation frequency outputted from the first 41, the second 42 and the third phase 43 shifters with the signal outputted from the first 21 and the second LNA 22 and the fourth filter 14, then, outputs an intermediate signal.

The first filter 11 passes a 900 MHz band signal, the second filter 12 passes a 1800 MHz band signal, and the third filter 13 passes a 1900 MHz band signal. Further, the fourth filter 14 eliminates an image signal existed in the signal outputted from the third LNA 23, then divides the image signal into positive and negative portions and subsequently inputs them to the fifth 55 and the sixth 56 mixers respectively in order to eliminate more noise elements.

In order to use the conventional dual band mobile communication terminal in three bands, the RF receiver has to be replaced into a triple band RF receiver. In this triple band RF receiver, each terminal corresponds to each frequency band, and a low noise amplifier and a filter for a PCS have to be additionally implemented, therefore, production process and production cost are increased.

In addition, in the conventional triple band receiving apparatus for the mobile communication terminal, implementing a RF receiver includes each terminal for each frequency band. Because an internal circuit construction is complicated and its volume is increased, it runs contrary to the recent mobile communication system trend of miniaturization and light-weight.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide a triple band receiving terminal of a mobile communication system, which can be used in three bands by adding a switching unit for band selection and adding an impedance matching unit to a RF receiver of a dual band mobile communication terminal.

It is another object of the present invention to provide a triple band receiving terminal of a mobile communication system, which is capable of simplifying a RF receiver circuit of a dual band mobile communication terminal.

In order to achieve the above-mentioned objects, a triple band receiving terminal of a mobile communication system includes a filter unit for passing only a reception frequency corresponding to each frequency band among signals received through an antenna, an impedance matching unit for matching an impedance of an output signal passing the filter unit, and a switching unit for selectively connecting a signal outputted from the impedance matching unit to a RF (radio frequency) receiver.

The triple band receiving terminal also includes a first, a second and a third filters for passing only signals corresponding to a first, a second and a third bands, an impedance matching unit for impedance-matching signals passing the second and the third filters, and a RF (radio frequency) receiver for processing signals inputted from the first filter and the switching unit as an intermediate frequency.

Further, a triple band receiving terminal of a mobile communication system includes three filters for filtering signals in three different bands, a first and a second matching units for impedance-matching the signals passing the second and the third filters, a switching unit for selectively connecting to the first or the second matching unit, a first and a second low noise amplifiers for amplifying signals inputted form the first filter and the switching unit at a certain level, a first and a second phase shifts for phase-modulating an oscillation frequency outputted from the local amplifier, a first and a second mixers for mixing an output signal of the first low noise amplifier with the oscillation frequency outputted from the first phase shift, and a third and a fourth mixers for mixing an output signal of the second low noise amplifier with the oscillation frequency outputted from the second phase shift.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
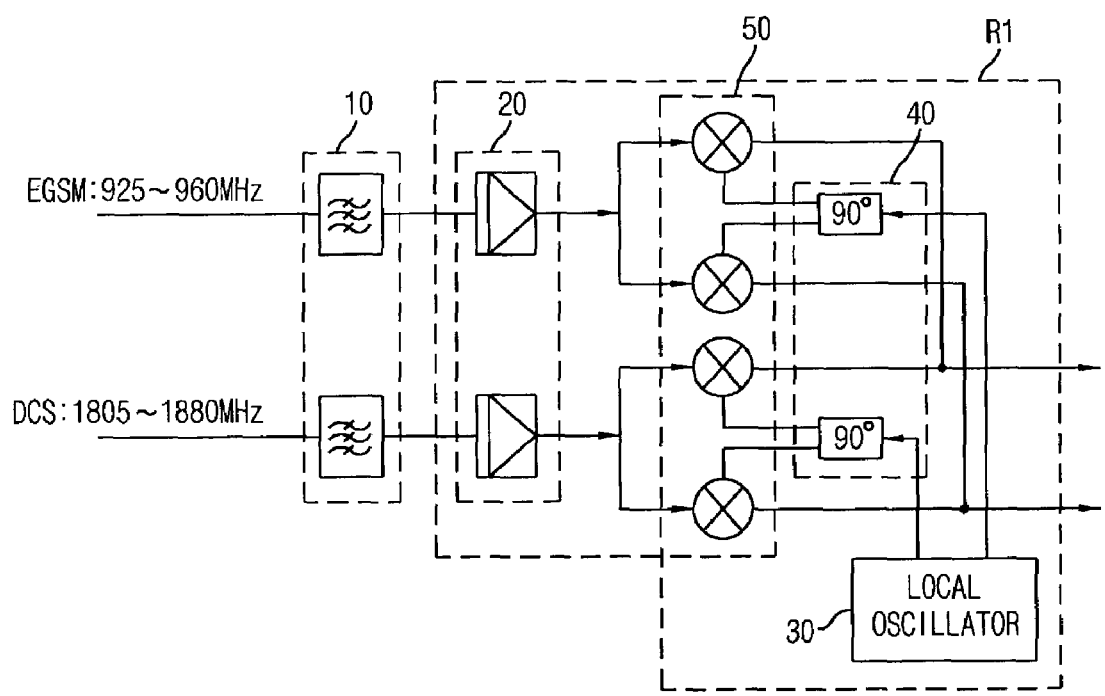
FIG. 1 is a block diagram illustrating a dual band receiving terminal of a mobile communication system in accordance with the related art.
Figure 2:
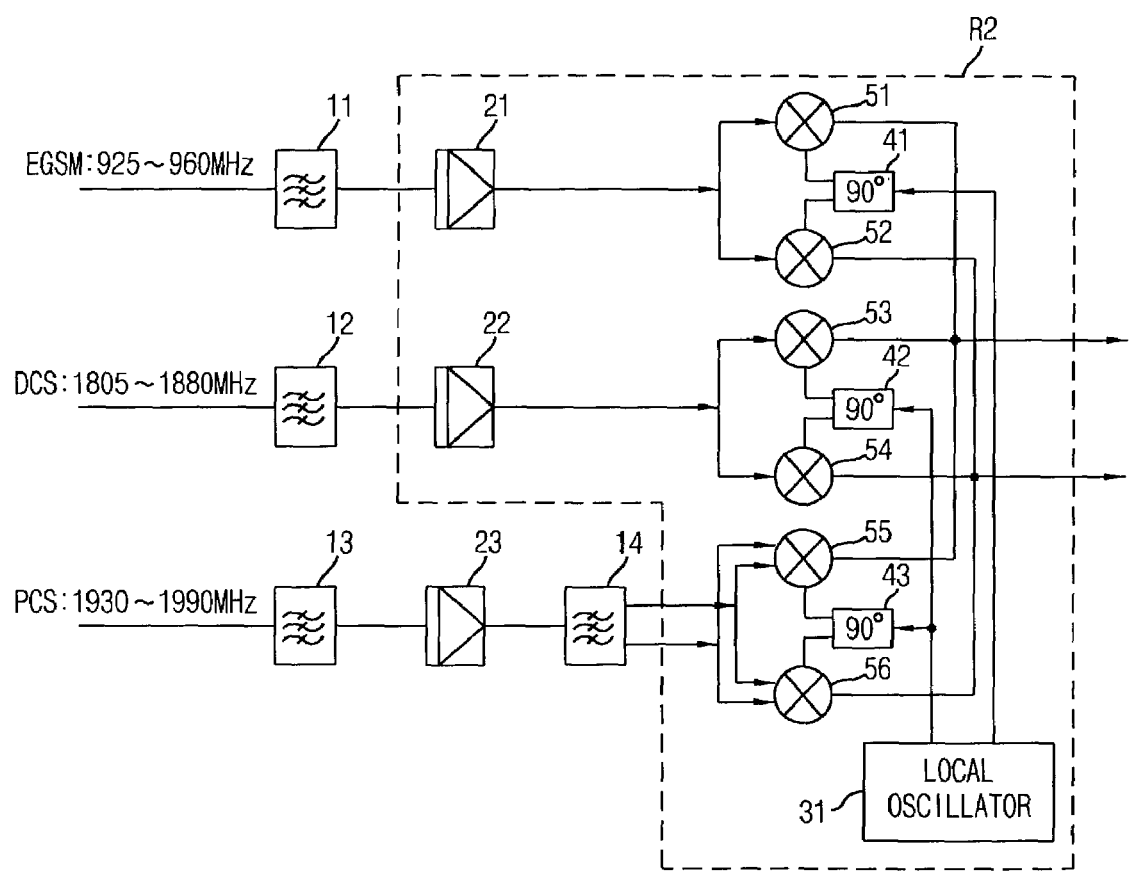
FIG. 2 is a block diagram illustrating a triple band receiving terminal of a mobile communication terminal in accordance with the related art.
Figure 3:
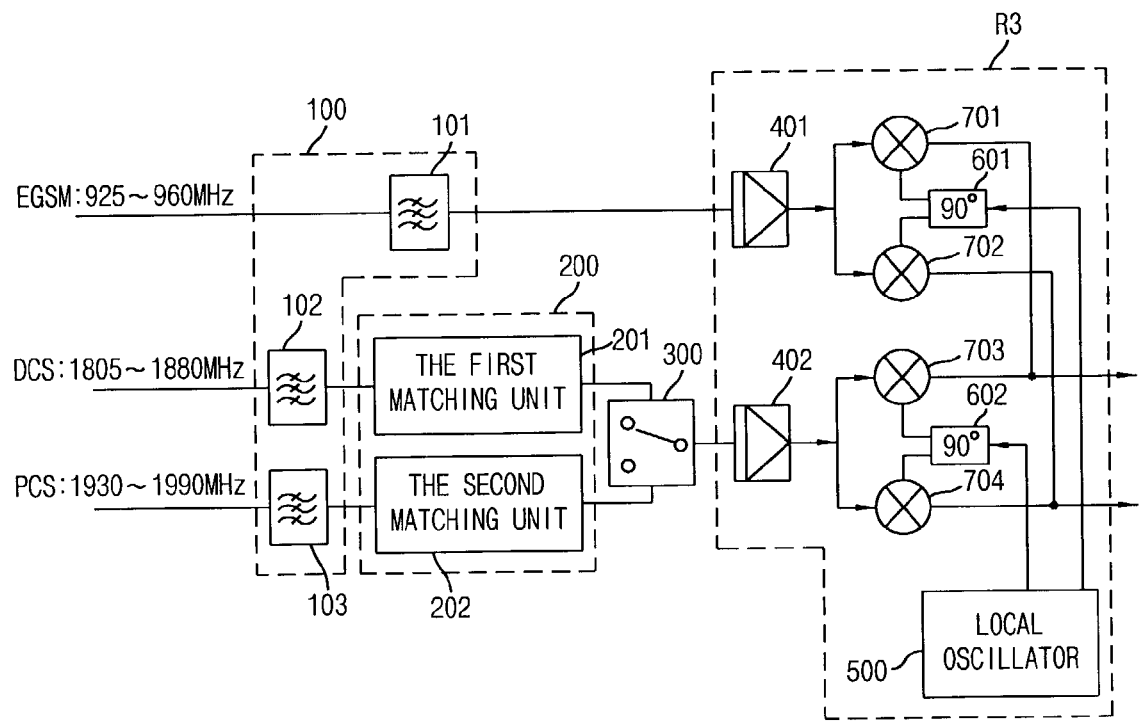
FIG. 3 is a block diagram illustrating a preferred embodiment of a triple band receiving terminal of a mobile communication system in accordance with the present invention.

FIG. 3 is a circuit diagram illustrating a preferred embodiment of a triple band receiving terminal of a mobile communication system in accordance with the present invention. As depicted in FIG. 3, a triple band receiving terminal allows a mobile communication system operate in multiple bands, such as a 900 MHz EGSM (extended global system for mobile communication), a 1800 MHz DCS (digital cellular system) and a 1900 MHz PCS (personal communication system) through an antenna.

The triple band receiving terminal of the mobile communication system includes a filter unit 100 passing respective reception frequencies corresponding to each frequency band among signals received through an antenna (not shown), an impedance matching unit 200 matching an impedance of signals outputted through the filter unit 100, a switching unit 300 selectively outputting a signal passing the impedance matching unit 200, and a RF (radio frequency) receiver R3 mixing the signal from the switching unit 300 with the signal from the filter unit 100 and outputting an intermediate frequency.

The filter unit 100 includes a first filter 101 passing a 925~960 MHz EGSM signal, a second filter 102 passing a 1805~1880 MHz DCS signal and a third filter 103 passing a 1930~1990 MHz PCS signal.

The impedance matching unit 200 includes a first matching unit 201 receiving output of the second filter 102 and outputting to the switching unit 300, and a second matching unit 202 receiving output of the third filter 103 and outputting to the switching unit 300. However, the first matching unit 201 and the second matching unit 202 adjust an impedance mismatching before the input end of the RF receiver (R3), occurred according to an additional installation of the switching unit 300, as 50 ohm. The switching unit 300 selects one of the signals outputted through the first matching unit 201 or the second matching unit 202 according to a band selection signal outputted from a control unit (not shown) and inputs it to the RF receiver (R3).

The RF receiver (R3) includes a first 401 and a second 402 low noise amplifiers amplifying signals inputted through the first filter 101 and the switching unit 300, a first 601 and a second 602 phase shifters receiving an oscillation frequency outputted from the local oscillator 500 and modulates the frequency in quadrature, and a first 701, a second 702, a third 703 and a fourth 704 mixing units mix the oscillation frequency outputted through the first and the second phase shifters 601, 602 with the signal outputted from the first and the second low noise amplifiers 401, 402 and outputting an intermediate frequency signal. Preferably, the RF receiver (R3) has the same structure as the dual band RF receiver (R2).

The local oscillator 500 outputs oscillation frequencies to two phase shifters respectively according to an EGSM signal, a DCS signal and a PCS signal received through the antenna (not shown). The first and the second phase shifters 601, 602 are set as 90°, however, an oscillation frequency received from the local oscillator 500 is different according to a frequency of a signal inputted through the antenna (not shown). An oscillation frequency outputted from the first and the second phase shifts 601, 602 is different according to an reception signal inputted to the system.

Further, the first 701 and the second 702 mixers mix the signal outputted from the first low noise amplifier 401 with the oscillation frequency outputted from the first phase shifter 601, and the third 703 and the fourth 704 mixers mix the signal outputted from the second low noise amplifier 402 through the switching unit 300 with the oscillation frequency outputted from the second phase shifter 602.

A certain band signal is inputted to the first 101, the second 102 and the third 103 filters through the antenna (not shown), the first, the second and the third filters 101, 102 and 103 filter respective reception frequencies. Specifically, among reception frequencies, a 925~960MHz EGSM signal is filtered in the first filter 101, a 1805~1880 MHz DCS signal is filtered in the second filter 102, and a 1930~1990 MHz PCS signal is filtered in the third filter 103.

The signal passing the first filter 101 is amplified at a certain level by passing the first low noise amplifier 401 of the RF receiver (R3) and is inputted to the first and the second mixers 701, 702. In the meantime, the first phase shifter 601 receiving the oscillation frequency outputted from the local oscillator 500 outputs a quadrature-modulated signal to the first and the second mixers 701, 702. The first and the second mixers 701, 702 mix the signal outputted from the first low noise amplifier 401 with the oscillation frequency outputted from the first phase shifter 601 and outputs an intermediate frequency signal.

Further, the signal passing the second and the third filters 102, 103 is respectively inputted to the first and the second matching units 201,202. Thereafter, the first and the second matching units 201, 202 placed before the input end of the switching unit 300 adjust an impedance mismatching before the input end of the RF receiver (R3).

The DCS signal passing the second filter 102 is impedance-matched in the first matching unit 201. The DCS signal passes the switching unit 300 and is inputted to the second low noise amplifier 402 of the RF receiver (R3), and is then amplified at a certain level, and finally is inputted to the first and the second mixers 701, 702. Furthermore, the second phase shifter 602 receiving the oscillation frequency outputted from the local oscillator 500 outputs respective modulated signals to the third and the fourth mixers 703, 704. The third and the fourth mixers 703, 704 mix the signal outputted form the second low noise amplifier 402 with the oscillation frequency outputted from the second phase shifter 602 and outputs an intermediate frequency signal.

Particularly, the PCS signal passing the third filter 103 is impedance-matched in the second matching unit 202. The PCS signal passes the switching unit 300, and is inputted to the second low noise amplifier 402 of the RF receiver (R3), is amplified at a certain level and is finally inputted to the first and second mixer 701, 702. Furthermore, the second phase shifter 602 receiving the oscillation frequency outputted form the local oscillator 500 outputs the quadrature-modulated signal to the third and the fourth mixers 703, 704. The third and the fourth mixers 703, 704 mix the signal outputted from the second low noise amplifier 402 with the oscillation frequency outputted form the second phase shifter 602 and outputs an intermediate frequency signal.

Specifically, in the preferred embodiment of the triple band receiving terminal of the mobile communication system in accordance with the present invention, the DCS signal and the PCS signal share the same input end of the RF receiver. Accordingly, at the exterior of the RF receiver (R3), respective filters pass the DCS signal and the PCS signal, respective matching units perform an impedance matching of the signal outputted from the respective filters and a band selection switching unit 300 selectively input signals passing the matching units to the low noise amplifier 402 of the RF receiver (R3) are installed.

As described above, in the triple band receiving terminal of the mobile communication system, by constructing a matching unit for signal impedance matching and a band selection switching unit at the exterior of a dual band RF receiver, the construction of an internal circuit can be simplified, the production process and the production cost can also be reduced.

In addition, in the triple band receiving terminal of the mobile communication system, by constructing the triple band receiving terminal operated in three bands by using a dual band RF receiver, the internal circuit construction can be simplified and the space can be minimized, and accordingly a mobile communication system can be efficiently small size and light-weighed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A tri-band receiving terminal of a mobile communications system, comprising:
   a filter unit which filters signals in each of three frequency bands;
   a dual-band radio frequency (RF) receiver including first and second inputs, which respectively receive first and second signals;
   a switching unit disposed on an exterior of the dual-band RF receiver and having an output connected to the second input of the dual-band RF receiver, and having a first input for receiving a first-band signal and a second input for receiving a second-band signal and which switches between selection of the first-band signal and the second-band signal, the second-band signal being of a different frequency than the first-band signal, wherein the switching unit switches between selection of the first-band signal and the second-band signal based on a band select signal; and
   an impedance-matching unit including a first matching unit connected to the first input of the switching unit and a second matching unit connected to the second input of the switching unit, and which adjusts an impedance mismatch before the second input of the RF receiver caused by the switching unit, wherein the dual-band RF receiver receives a third-band signal at the first input of the dual-band RF receiver, the third-band signal being of a different frequency than the first-band signal and the second-band signal.

2. The terminal of claim 1, wherein the RF receiver outputs an intermediate frequency.

3. The terminal of claim 1, wherein the RF receiver comprises:
   an amplifier which amplifies the signal selected by the switching unit;
   an oscillating unit which generates a phase-modulated oscillation signal; and
   a mixing unit which mixes the oscillation signal with an output of the amplifier.

4. The terminal of claim 3, wherein the oscillating unit comprises:
   a local oscillator which outputs an oscillation frequency; and
   a phase shift unit for phase-modulating the oscillation frequency.

5. The terminal of claim 4, wherein the local oscillator outputs a different oscillation frequency based on the frequency band of a received signal.

6. An apparatus for a triple band receiving terminal of a mobile communication system, comprising:
- a first filter for passing signals corresponding to a first band;
- a second filter for passing signals corresponding to a second band;
- a third filter for passing signals corresponding to a third band;
- a dual-band radio frequency (RF) receiver including a first input and a second input for respectively receiving first and second signals;
- a switching unit having first and second inputs for respectively receiving two of the three band-filtered signals and having an output connected to the second input of the dual-band RF receiver for outputting one of the two band-filtered signals based on a control signal, wherein the switching unit outputs a first-band signal or a second-band signal based on a band select signal; and
- an impedance-matching unit including a first matching unit connected to the first input of the switching unit and a second matching unit connected to the second input of the switching unit, and which adjusts an impedance mismatch before the second input of the RF receiver caused by the switching unit, wherein the dual-band RF receiver receives a third-band signal at the first input of the dual-band RF receiver, the third-band signal being of a different frequency than the first-band signal and the second-band signal.

7. The apparatus of claim 6, wherein the second band and the third band are frequency bands adjacent each other.

8. The apparatus of claim 6, wherein the RF receiver comprises:
- an amplifier for amplifying a reception signal inputted through the first filter and the switching unit at a predetermined level;
- a local oscillator for generating and outputting an oscillation frequency;
- a first phase shifter and a second phase shifter for receiving the oscillation frequency from the local oscillator and phase-modulating the oscillation frequency; and
- a mixer for outputting an intermediate frequency by mixing the signals outputted from the first and the second phase shifters with the signal outputted from the amplifier.

9. The apparatus of claim 8, wherein the amplifier comprises:
- a first low noise amplifier for amplifying a signal received through the first filter at a predetermined level; and
- a second low noise amplifier for amplifying a signal received through the second or the third filter at a predetermined level.

10. The apparatus of claim 8, wherein the local oscillator outputs a different oscillation frequency according to a frequency band of a received signal.

11. The apparatus of claim 8, wherein the first and the second phase shifters are respectively connected between the local oscillator and the mixers, and the phase shifters modulate the oscillation frequency in quadrature.

12. The apparatus of claim 8, wherein the mixer comprises:
- a first mixer and a second mixer connecting the first low noise amplifier with the first phase shifter; and
- a third mixer and a fourth mixer for connecting the second low noise amplifier with the second phase shifter.

13. An apparatus for a triple band receiving terminal of a mobile communication system, comprising:
- a first, a second, and a third filter for filtering signals in a first, a second and a third band;
- a first and a second matching unit for impedance-matching the signals passing through the second and the third filters;
- a switching unit for selectively connecting to the first or the second matching unit; a first and a second low noise amplifier for amplifying signals inputted from the first filter and the switching unit at a predetermined level;
- a first and a second phase shifter for phase-modulating an oscillation frequency outputted from a local oscillator;
- a first and a second mixer for mixing an output signal of the first low noise amplifier with the oscillation frequency outputted from the first phase shifter; and
- a third and a fourth mixer for mixing an output signal of the second low noise amplifier with the oscillation frequency outputted from the second phase shifter,
- wherein the first and second matching units are disposed between the second and third filters and the switching unit and adjust an impedance mismatch at the second low noise amplifier caused by the switching unit,
- wherein the first and second low noise amplifiers, the first and second phase shifters, the first and second receivers and the third and fourth mixers comprise a dual-band receiver constructed as a single unit, and
- wherein the switching unit, the first and second matching units and the first, second and third filters are constructed on an exterior of the dual-band receiver so as to form the triple band receiving terminal.

14. The apparatus of claim 13, wherein the second band and the third band are frequency bands adjacent each other.

15. The apparatus of claim 13, wherein the switching unit connects the first or the second matching unit with the second low noise amplifier according to a band selection signal.

16. The apparatus of claim 13, wherein the local oscillator outputs a different oscillation frequency according to a frequency band of a received signal.

17. The apparatus of claim 13, wherein the first and the second phase shifters are connected between the local oscillator and the mixer, and the phase shifters modulate the oscillation frequency in quadrature.

18. The apparatus of claim 13, wherein the switching unit selects between an output at the first matching unit and an output of the second matching unit based on a select signal.

19. A signal processor in a mobile communications system, comprising:
- a first impedance-matching unit which matches an impedance of a signal received within a first frequency band;
- a second impedance-matching unit which matches an impedance of a signal received within a second frequency band, the second frequency band being a different frequency band than the first frequency band;
- a switching unit which selects a signal output from one of the first impedance-matching unit and the second impedance-matching unit;
- a dual-band radio frequency (RF) receiver including first and second inputs, which respectively receive first and second signals, the dual-band RF receiver receiving the selected signal from the switching unit at the second input and receiving a signal corresponding to a third frequency band at the first input, the third frequency band being a different frequency band than the first frequency band and the second frequency band;
- a first filter which filters signals within the first frequency band; and a second filter which filters signals within the second frequency band, said first filter and said second filter respectively connected to inputs of the first impedance-matching unit and the second impedance-matching unit, wherein the first and second impedance-matching units are disposed between the first and second filters and the switching unit and the first and second impedance-matching units adjust an impedance mismatch at the second input of the dual-band RF receiver caused by the switching unit.

20. The signal processor of claim 19, wherein the switching unit selects a signal output from one of the first impedance-matching unit and the second impedance-matching unit based on a frequency band corresponding to a received signal.

21. The signal processor of claim 20, wherein the dual-band RF receiver comprises:

an oscillator which outputs an oscillation signal based on the frequency band of the received signal; and a mixer which mixes the oscillation signal with the output signal selected by the switching unit.

22. The signal processor of claim 21, wherein the oscillation signal output from the oscillator corresponds to an intermediate frequency.

23. The signal processor of claim 19, wherein the first frequency band includes a digital cellular band and the second frequency band includes a PCS band.

24. The signal processor of claim 19, wherein the switching unit selects between an output of the first impedance-matching unit and an output of the second impedance-matching unit based on a band select signal.

* * * * *